May 19, 1970  F. M. NASH  3,512,644
AUTOMATIC FILTER BACKWASH ASSEMBLY
Filed June 28, 1967  3 Sheets-Sheet 1
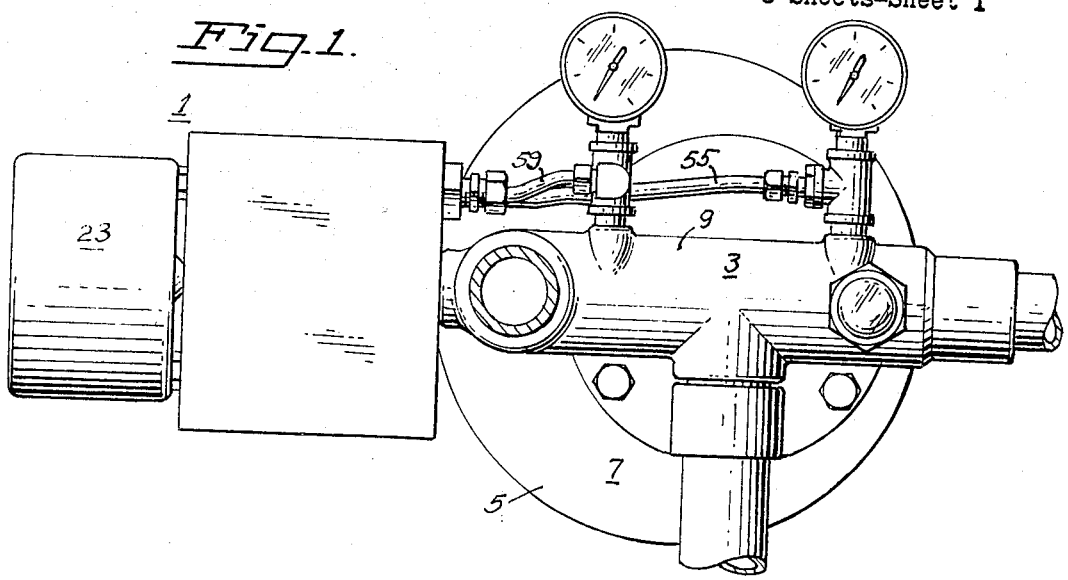
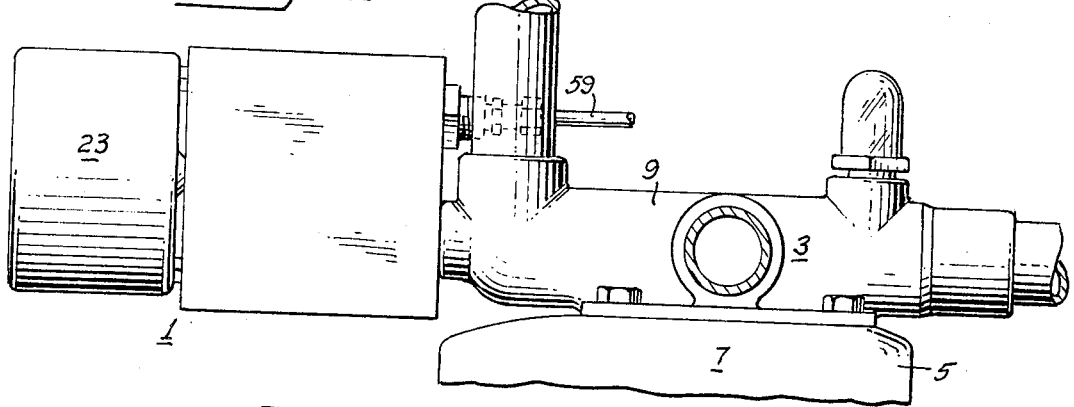
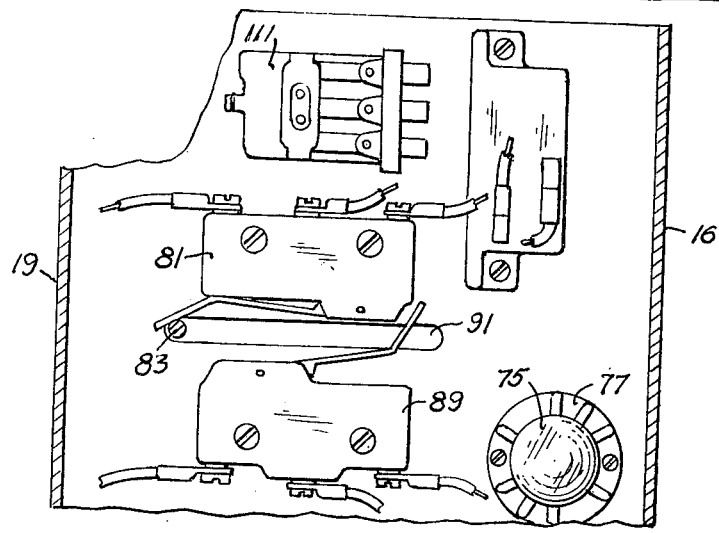
INVENTOR.
FLOYD M. NASH
BY Edward Brosler
ATTORNEY May 19, 1970 F. M. NASH 3,512,644
AUTOMATIC FILTER BACKWASH ASSEMBLY
Filed June 28, 1967 3 Sheets-Sheet 2
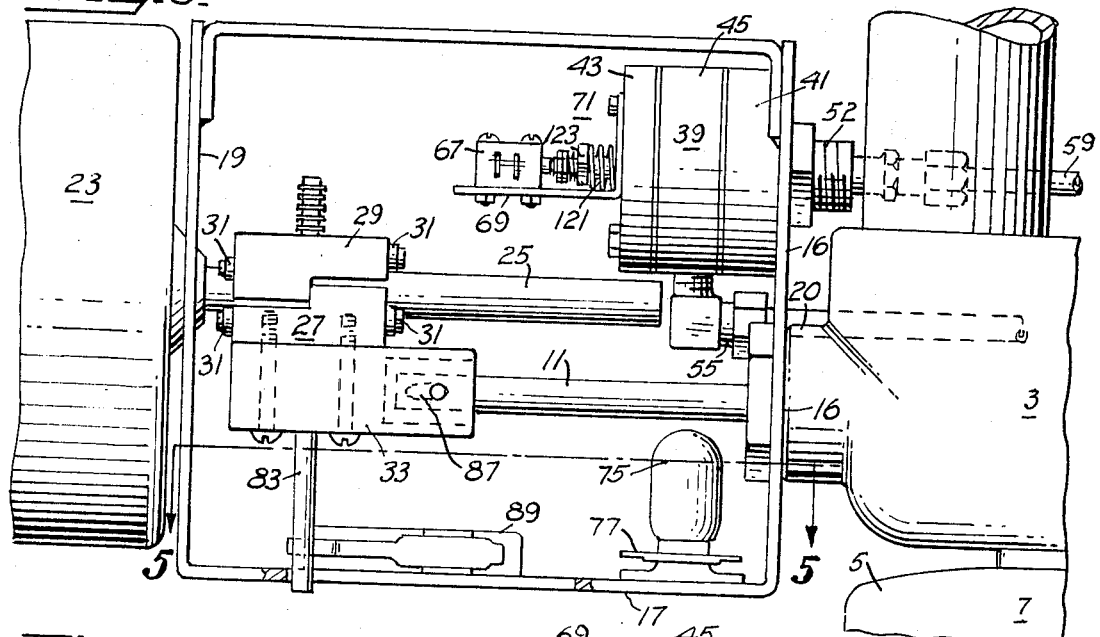
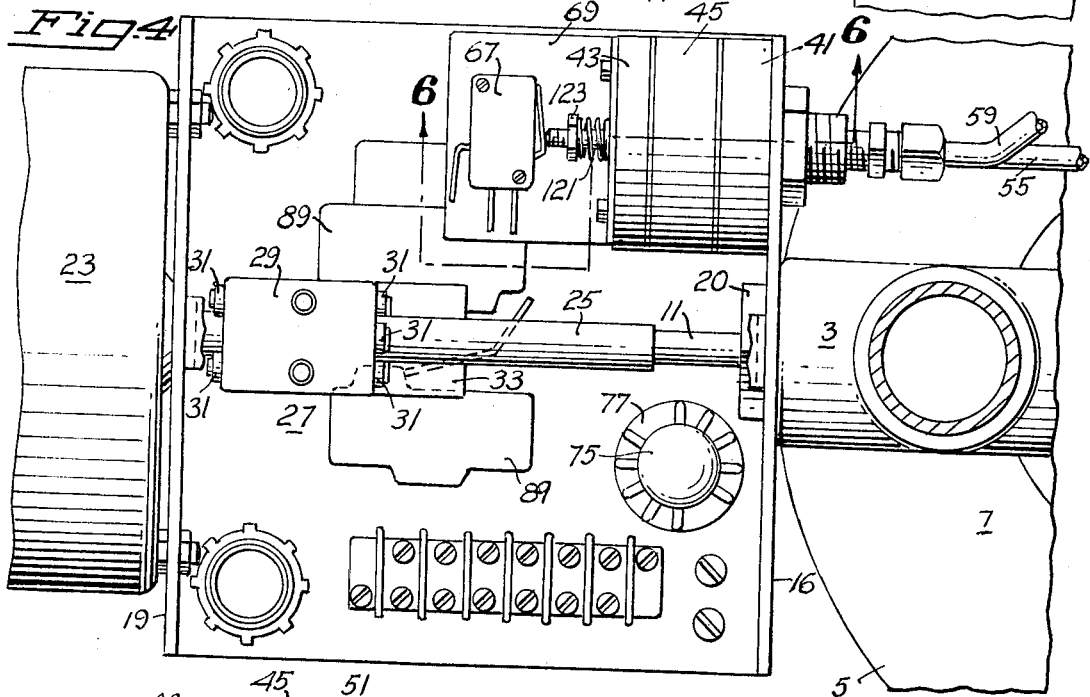
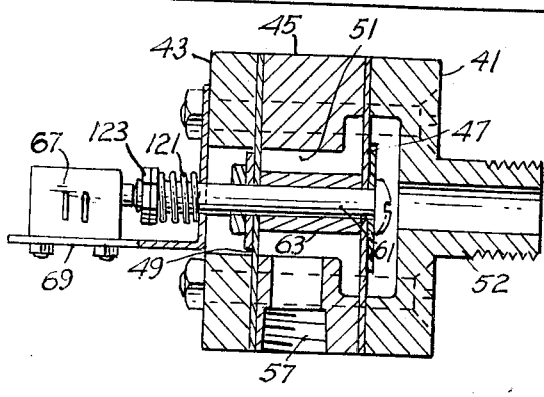
INVENTOR.
FLOYD M. NASH
BY
Edward Brosler
ATTORNEY

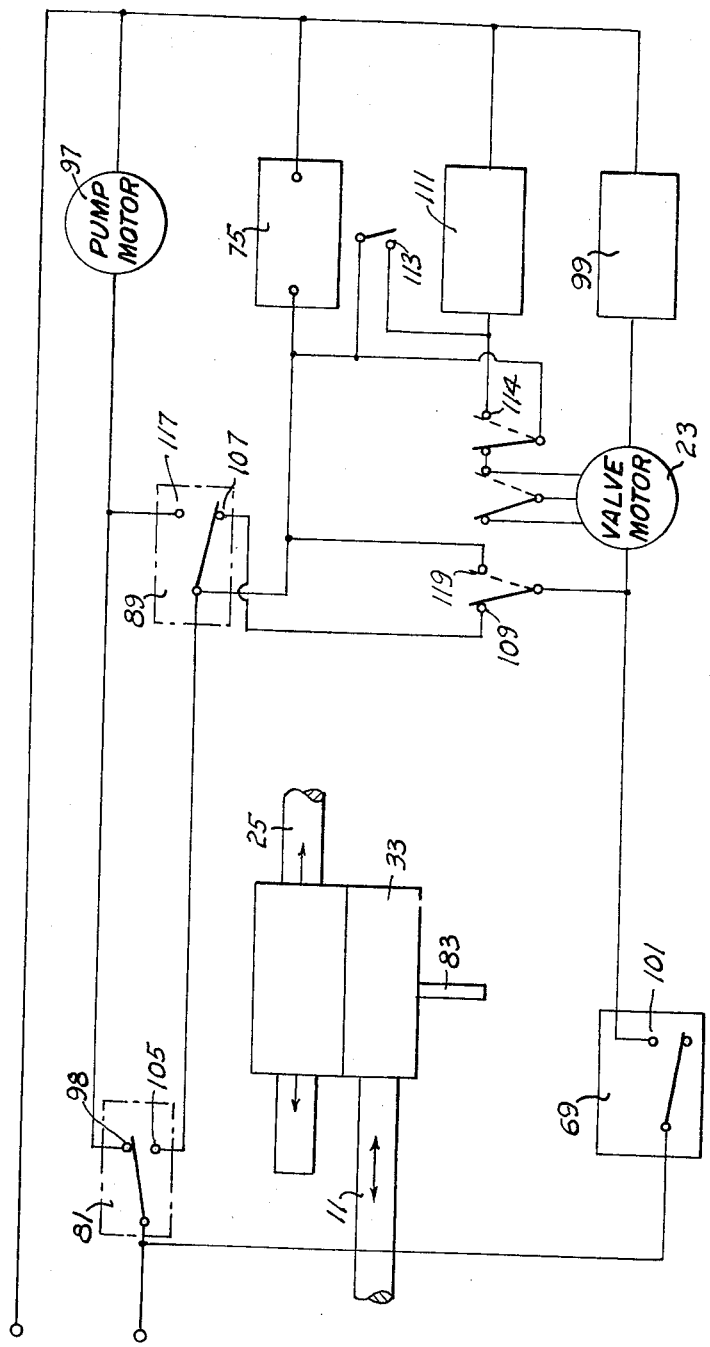

United States Patent Office 3,512,644
Patented May 19, 1970

3,512,644
AUTOMATIC FILTER BACKWASH ASSEMBLY
Floyd M. Nash, Little Rock, Ark., assignor to Jacuzzi Bros., Incorporated, a corporation of California
Filed June 28, 1967, Ser. No. 649,582
Int. Cl. B01d 29/38
U.S. Cl. 210—108                    1 Claim

ABSTRACT OF THE DISCLOSURE

An assembly responsive to a build-up of the differential pressure across the filter with increasing accumulation of dirt in the filter, for automatically shifting a reversing valve to effect a backwash operation of the filter for a predetermined period of time.

My invention relates to filter systems such as employed in connection with the operation of swimming pools or the like, and, more particularly, relates to the cleaning of the filters in such systems.

Filters perform a very essential function in cleaning and maintaining the cleanliness of the water in a pool. While some of the dirt settles as sediment on the pool floor, and can be vacuumed off through a suction head connected to an outlet fitting in the pool wall, which in turn connects with the filter of the system, and while some of the dirt may go down the pool drain to also be conveyed to the filter, the greater portion of the dirt, inclusive of debris, settling on the water, may be drawn off to the filter through skimming means in the pool wall at water level.

The more effective the skimming means, the smaller the amount of dirt which will settle to the bottom of the pool and accordingly, the cleaner the water.

The efficiency of the skimming operation depends in large measure on maintaining a substantial flow from the surface level of the pool into the skimming means. Such flow, however, could be impaired, if the filter were permitted to choke up with dirt, since all the water from the pool is circulated by a pump through the filter and then directed back to the pool.

It is customary, therefore, to clean the filter at intervals, by reversing the flow of water therethrough and usually discarding it to waste.

Backwashing operations have previously been controlled manually, and, accordingly, the timing had little if any relationship to the need, sometimes being initiated when not required, and often after the filter media had greatly exceeded the concentrational level at which a backwash operation would normally be called for.

Automatic backwashing has been attempted in the past, but apparently without too much commercial success, as such automatic systems were hydraulically actuated and controlled with a time clock, and the backwash operation took place periodically, whether the filter needed cleaning or not.

Among the objects of my invention are:

(1) To provide novel and improved filter backwash for controlling the backwash operations of a filter, as and when needed, thereby eliminating the human element;

(2) To provide a novel and improved filter backwash assembly which will initiate a backwash operation when the filter completes its most efficient range of operation;

(3) To provide a novel and improved filter backwash assembly which is one hundred percent automatic in controlling the backwash operations of a filter;

(4) To provide a novel and improved filter backwash assembly for controlling backwash operations of a filter, and which is unique, simple, and reliable;

(5) To provide a novel and improved filter backwash assembly for controlling backwash operations of a filter, and which requires no additional plumbing or electrical wiring; and (6) To provide a novel and improved filter backwash assembly for controlling backwash operations of a filter, and which may be readily installed in the field, in an existing manually controlled system. Additional objects of my invention will be brought out in the following description of a preferred embodiment of the same, taken in conjunction with the accompanying drawings, wherein, FIG. 1 is a view in plan, of a filter backwash assembly of the present invention, as installed in functional relationship to a typical filter and associated reversing valve;

FIG. 2 is a view in elevation, of the apparatus of FIG. 1;

FIG. 3 is a view in elevation of the backwash assembly of FIG. 1, with the cover removed, and partly in section;

FIG. 4 is a plan view of the backwash assembly of FIG. 3;

FIG. 5 is a fragmentary view taken in the plane 5—5 of FIG. 3;

FIG. 6 is a view taken in the planes 6—6 of FIG. 4; and

FIG. 7 is a wiring diagram depicting the electrical circuits involved in the operation of the automatic filter backwash assembly of the preceding figures.

Referring to the drawings for details of my invention in its preferred form, the automatic filter backwash assembly 1 is installed at the stem end of a reversing valve 3 mounted on the casing 5 of a filter 7.

The reversing valve is of the type in which a valve within a valve housing 9 is motivated through longitudinal actuation of a valve stem 11 extending from one end of the valve housing.

The filter backwash assembly involves a mounting bracket including a front wall 16, floor 17, and rear wall 19, for the mounting of the various components of the assembly, the front wall having an opening therethrough to receive the valve stem end 20 of the valve housing, for the mounting of the bracket thereon in any conventional manner.

A reversible electric motor 23 is supported on the rear wall 19 of the bracket with a drive shaft 25 extending in the direction of the reversing valve, and on which shaft is installed a carriage assembly 27 which, in one direction of rotation of the shaft, will travel along the shaft in a forward direction, and, upon reversal of the motor, will travel along the shaft in the reverse direction. While the drive connection between the shaft and the carriage could take the form of a worm and pinion drive, I prefer to utilize a linear actuator 29 marketed under the trademark Rohlix, by Barry B. Controls, a division of Barry Right Corporation.

Basically, such drive involves a plurality of bearing rollers 31 installed in the carriage assembly in angular contact with the motor shaft 35 whereby a component of longitudinal movement will be imparted to the carriage in response to rotation of the motor shaft. The essence of the present invention, however, does not lie in the specific type of drive at this point.

Included as a component part of the carriage assembly, below the motor shaft, is a coupling element 33 to which the exposed end of the valve stem 11 may be coupled, whereby the valve may be caused to move in accordance with carriage travel.

For one direction of rotation of the motor, the valve will be shifted to its normal filtering position, while a reversal of direction of rotation of the motor, will cause the valve to shift to its backwash determining position. The internal construction of this valve and its relationship to the filter system as a whole, constitutes no part of the present invention, but is illustrated and described in a copending application of mine for High Flow Sand and Gravel Type Filter, Ser. No. 495,517, filed Oct. 13, 1965, now U.S. Pat. No. 3,381,823.

During operation of a filter, sediment increasingly accumulates in the filter media, gradually building up a resistance to the flow of water through the filter. This has the effect of developing a gradually increasing differential pressure across the filter, and if permitted to continue uninterrupted, the filter would automatically choke up with accumulated sediment. At some intermediate point before this is permitted to happen, it becomes desirable to reverse the flow of water through the filter to backwash the same and remove the sediment to drain, in preparation for another filtering operation.

It has been found that when the filtering media of the filter has accumulated approximately 75 percent of its dirt holding capacity, that the pressure drop thereacross is still relatively low and tolerable, but that beyond this point, the differential pressure drop across the filter medium increases rapidly with additional accumulation of sediment, until the filter chokes up and blocks further flow of water therethrough from the pump. Thus, for efficient operation of a filter, the filter should be backwashed when accumulated sediment has approached the 75 percent of the dirt-holding capacity of the filter.

The present invention is predicated upon initiating a backwash operation in response to an accumulation of sediment in the filter media to the point of approximately 75 percent of its dirt-holding capacity. Inasmuch as this represents a determinable differential pressure for any particular filter, the invention contemplates utilizing this differential pressure for bringing about a shift of the reversing valve from its filter position to its backwash position.

Toward this end, I provide a pressure differential sensing means 39 capable of responding to the differential pressure changes occurring across the filter during a filtering operation. Such sensing means may take the form of a sectional housing including two end sections 41, 43 and an intermediate section 45, between which are clamped a pair of spaced diaphragms 47, 49 to define a chamber 51 within the housing. The end component 41 is hollow and provided with a tube fitting 52, which can be used also for mounting the housing on the front wall 16 of the backwash assembly bracket. The housing components are so dimensioned internally as to expose a larger area of the one diaphragm 47.

A pressure connection 55 from the intake end of the filter leads to the chamber between the diaphragms by way of a threaded opening 57 through the wall of the intermediate section of the housing, while another pressure connection 59 leads from the discharge end of the filter to that end section 41 of the housing associated with the diaphragm 47 of larger exposed area. Inasmuch as both pressure conditions exist within the reversing valve housing 9, the pressure connections may be made to appropriate locations in the valve housing.

It will be apparent from the foregoing, that both diaphragms will be exposed within the chamber 51 to the high pressure side of the filter, while the diaphragm 47 of larger exposed area, will have its opposite side exposed to the low pressure end of the filter. By mechanically coupling the two diaphragms, the effect of the high pressure on the diaphragm of large exposed area is considerably reduced by the tendency of the diaphragm of smaller exposed area to move in the opposite direction.

If the resultant overall pressure effect on the chamber side of the diaphragm of larger exposed area is insufficient to overcome the pressure effect from the low pressure end of the filter, then the diaphragms, which now must move as a unit, may tend to move toward the left, as viewed in FIG. 5, but as the pressure differential across the filter increases with accumulation of sediment in the filter media, the diaphragms, moving as a unit, will shift toward the right and ultimately beyond their neutral position.

If the mechanical coupling means is in the form of a bolt 61 extending through both diaphragms and emerging from the housing through an opening in the housing end section 43, with a spacer sleeve 63 about the bolt intermediate the two diaphragms, such mechanical coupling means may then be employed as an actuator for a microswitch 67 supported on a bracket 69 from the housing in line with the actuator.

This microswitch is preferably one of the normally closed type, adapted to be opened in response to pressure applied thereto.

The pressure sensing means 39 and microswitch 67 constitute a pressure sensing switch assembly 71. When pressure coupled to the high and low pressure end of the filter as previously described, in preparation for a filtering operation, the relatively low differential pressure initially existing across the filter, will cause the actuator to engage the microswitch and hold it in its open position. As the pressure differential across the filter increases due to accumulation of sediment, the tendency of the diaphragms to shift in the opposite direction will relieve the microswitch of the pressure of the actuator and ultimately cause the microswitch to assume its normally closed condition.

This switch may be included in a circuit to energize the motor to bring about a reversal of the filter valve when the filter differential pressure reaches a certain value, and thus place it in a condition for a backwash operation.

The time required for a backwash operation will be substantially the same for any particular filter, and consequently the time period when once determined, may then be controlled by some timing means, which, in the preferred form of the present invention, takes the form of a time delay relay 75 mounted in an appropriate socket 77 on the floor of the backwash assembly bracket.

The above described components control the basic filter and backwash operations, the pressure sensing switch assembly in response to a predetermined differential pressure developing across the filter, and the time delay by its timing function. For more effective control, however, certain other factors should be considered.

So long as the filter pump is in operation, pressure conditions exist in the reversing valve which place a load on the valve, rendering it more difficult to shift the same between its filter and backwash positions.

Also, if a valve is shifted when the pump is running, all of the flow passages are open during the time the valve is being shifted. This causes a marked reduction in back pressure, resulting in a large increase in flow rate through the circulating system. This sudden increase in flow rate dislodges sediment that is accumulated in the circulating system and a portion of this sediment laden water enters the pool return line, which is eventually discharged into the pool and appears as a dirt cloud. If the valve is shifted when the pump is idle, this sediment is not disturbed and therefore will not enter the pool return line.

To take care of these situations, the invention incorporates means for temporarily disconnecting the pump motor during valve shifting operations, such means, in the preferred form of the invention, involving pole double throw microswitch 81 mounted on the floor of the backwash assembly, in position to be controlled by a pin 83 depending from the carriage 27 at or preferably before the carriage starts shifting the valve. To introduce a desired short time interval between the changing of the pump motor switch 81 and the shifting of the valve, a lost motion connection 87 between the coupling member 33 of the carriage and the valve stem 11 may be incorporated.

At the end of the valve shifting operation, this same pin may be caused to control a similar miscroswitch 89 mounted on the floor of the bracket, the operation of which may be caused to reconnect in circuit, the pump motor, and thus restart the pump for the backwash operation. A guide slot 91 for the pin, in the floor of the bracket will stabilize pin movement.

As previously indicated, the time delay relay will terminate the backwash operation by reversing the valve shifting motor 23 and causing the carriage to move back and reset the valve to its filter position. In the course of this operation, the pin will actuate the microswitches in the reverse order, thereby disconnecting the pump motor at the start of the resetting movement of the valve, and upon completion of such movement, the pump motor will again be placed in circuit to start the pump in preparation for the next filtering operation.

A circuit for assuring the functional relationships between the various components as described above, is depicted in FIG. 6 of the drawings, wherein the condition of all of the various depicted components exist for a filtering operation. Power is applied across the pump motor 97 through a normally open contact 98 of the microswitch 81, which contact is held closed by a pin 83 during filtering. Thus the pump is functioning.

The valve shifting motor 23 is connected across power through a protective thermal overload relay 99 and a normally engaged contact 101 of the differential pressure switch 69, such contact being held open during filtering by the actuator 61 until the pressure differential across the filter builds up to that point where a backwash operation is called for, at which time, the held open contact will be engaged to close the circuit.

When such contact is engaged, the valve shifting motor 23 will be energized for rotation in the direction of shifting the valve to its backwash setting. Immediately, the actuating pin will cause the proximate microswitch 81 to disengage its contact 98 to disconnect the pump motor; and with a lost motion connection between the carriage and the valve, such disconnection of the pump motor will occur before the valve shift motor will take hold of the valve stem to effect a shifting of the valve.

Upon de-energization of the pump motor, the pressure conditions in the filter will change dramatically, and this could produce a reaction in the pressure sensing switch assembly in the direction of opening the associated microswitch 69, which if permitted to occur, would upset the conditions throughout the apparatus. To avoid this possibility, a holding circuit is established across the contacts of the pressure sensing switch. This holding circuit includes a second contact 105 on the first pin controlled microswitch 81, a normally engaged contact 107 on the second pin controlled microswitch 89, and a normally engaged contact 109 of a three-pole double throw relay 111.

Also connected across the power source by the shifting of contacts associated with the microswitch 81, is the time delay relay 75 having associated therewith a pair of normally open contacts 113. This time delay relay is designed to close its contacts after a period of time of the order of two minutes or so, deemed sufficient to assure a satisfactory backwash operation. These normally open contacts when thus closed, complete a circuit through the three-pole double throw relay by way of the normally open contact 105 of the microswitch 81, which at this stage is engaged.

Upon completion of the travel of the carriage in shifting the valve to its backwash position, the associated pin 83 will engage the second microswitch 89 and close a circuit through the pump motor 97 by way of a contact 117 to energize the pump, while at the same time opening the holding circuit.

In the meantime, the conditions having changed in the pressure sensing switch 69, its normally closed contacts will be held open by the actuator, and accordingly, the valve shifting motor will become de-energized and come to a halt. Preferably, disconnection of power to the motor 23, is set to occur just prior to completion of the shifting operation, in the meantime, relying on the coasting of the motor to complete the shifting of the valve.

At the completion of the backwash operation, as determined by operation of the time delay relay, the three-pole double throw relay 111 will be connected in circuit through the now closed contacts 113 associated with the time delay relay 75, and energization of this relay 111 will re-establish power to the valve shifting motor 23 through a normally opened contact of the three-pole double throw relay, and as a second function of this relay, the various windings of this motor will be so connected as to cause it to operate in reverse.

In addition to reversing direction of the valve motor 23, energization of the relay 111 will add a normally open contact 114 in circuit across the contacts 113 to establish a holding circuit for the relay 111, and thus stabilize the operation of this relay 111 against possible erratic functioning of the time delay relay and its contacts 113.

With the valve shifting motor thus energized to function in reverse, the first thing to happen will be a shifting of the contacts of the then proximate relay 89, due to movement of the actuating pin from engagement with such microswitch. This will break the circuit to the pump motor and bring the pump to a standstill.

Immediately following this, the carriage will catch hold of the valve stem and begin shifting the valve back to its filtering position. For the completion of this valve shifting operation, the actuator pin will engage the microswitch toward which it is moving and shift its contacts to again place the pump motor on power with a resulting operation of the pump.

Simultaneously, therewith, such shifting of the microswitch contacts disconnects power from the valve shifting motor, the time delay switch and the three-pole double throw relay, with the result that the entire system is reset for a filtering operation.

The system and apparatus as described above will function effectively under all conditions except possibly where the filter is installed above the level of water in the pool, in which case, a negative pressure at times, could be developed in the pressure sensing switch assembly, thus interfering with its desired mode of operation. To accommodate the apparatus to such condition, the switch actuator is normally biased toward its switch opening position by a biasing spring 121 installed between the diaphragm housing and an adjusting nut 123 threaded onto the actuator.

From the foregoing description of my invention in its preferred form, it will be apparent that the same satisfies all the objects of my invention as pointed above, and while I have illustrated and described the same in its preferred form and in considerable detail, I do not wish to be limited in my protection on the specific details illustrated and described, except as may be necessitated by the appended claims.

I claim:

1. Automatic filter backwash assembly comprising in combination, a filter pump, a flow connection to the intake side of said pump, a filter, and a reversing valve for said filter adapted in one position, to flow connect the discharge side of said pump to the normal input end of said filter and the normal output end of said filter to a use inlet, and in another position, to flow connect said pump to the normal output end of said filter and the normal input end of said filter to a discharge, said automatic filter backwash assembly comprising differential pressure sensing means exposed to the prevailing differential pressure across said filter to sense changes in pressure drop across the filter media as dirt accumulates therein, said differential pressure sensing means including a pair of spaced diaphragms defining a chamber between them, one of said diaphragms having greater exposed area within said chamber than the other diaphragm, means coupling said diaphragms for unitary movement thereof in response to a build up of pressure in said chamber, means for externally exposing said diaphragm of greater exposed area to the prevailing pressure at the discharge side of such filter, means for exposing the interior of said chamber to the prevailing pressure at the input side of such filter, and switch actuator means coupled to said diaphragms for movement therewith, and means responsive to said differential pressure sensing means for shifting said valve from filter position to a backwash position, said valve shifting means including a reversible motor, a drive connection from said motor to said valve, means for electrically connecting said motor to an electrical source of power, said electrical connecting means including a normally spring closed switch, means, during minimum pressure conditions in said chamber, for pressure holding said switch in its open condition and adapted in response to build up of pressure in said chamber, to relieve said switch holding pressure and enable closing of said switch with resulting energization of said motor.

References Cited

UNITED STATES PATENTS

| | | | |
|---|---|---|---|
| 2,084,346 | 6/1937 | Jones | 210—108 |
| 2,183,577 | 12/1939 | McNeal | 210—108 X |
| 2,184,177 | 12/1939 | Burrell | 210—108 X |
| 2,366,903 | 1/1945 | Harms et al. | 210—108 |
| 2,451,073 | 10/1948 | Cowherd | 210—108 |
| 3,220,553 | 11/1965 | Growall et al. | 210—108 |
| 2,537,474 | 1/1951 | Mejean | 200—83.2 X |
| 2,654,995 | 10/1953 | Ostroff | 200—83.2 X |

JOHN W. ADEE, Primary Examiner

U.S. Cl. X.R.

200—83; 210—109, 416